United States Patent [19]

Wybenga

[11] 4,386,903
[45] Jun. 7, 1983

[54] INJECTION-MOLDING MACHINE WITH HYDRAULIC MOLD CLAMPING

[75] Inventor: William J. Wybenga, Brampton, Canada

[73] Assignee: Husky Injection Molding Systems Ltd., Bolton, Canada

[21] Appl. No.: 259,674

[22] Filed: May 1, 1981

[51] Int. Cl.³ .............................................. B29F 1/03
[52] U.S. Cl. .............................. 425/563; 264/328.11; 425/564; 425/565; 425/574
[58] Field of Search ............... 425/563, 564, 565, 574; 264/328.11

[56] References Cited

U.S. PATENT DOCUMENTS

| | | | |
|---|---|---|---|
| 3,117,348 | 1/1964 | Rees | 425/154 |
| 3,934,626 | 1/1976 | Holl | 425/563 X |
| 4,017,236 | 4/1977 | Rees | 425/150 |
| 4,133,622 | 1/1979 | Broun | 425/574 X |
| 4,230,442 | 10/1980 | Rees | 425/451.2 |
| 4,332,544 | 1/1982 | Aoki | 425/574 X |

Primary Examiner—Thomas P. Pavelko
Attorney, Agent, or Firm—Karl F. Ross

[57] ABSTRACT

A stationary platen of an injection-molding machine, carrying a mold portion with a sprue leading to one or more cavities, is connected by a set of metallic tie bars with a fixed part of the machine frame containing the mold drive and is limitedly slidable on the machine bed to an extent corresponding to the stretch of the tie bars under a mold-clamping force exerted by that drive upon another platen moving along the tie bars. An injection unit behind the stationary platen has a precompression chamber which communicates with a channel leading to an injection nozzle, this nozzle being received in a cutout of that platen and confronting the sprue through the head of a hollow gating plunger slidable in the nozzle orifice. The injection unit is mounted on a carriage arrestable in a position in which the head of the forwardly biased plunger, whose tail blocks the nozzle orifice, closely approaches the sprue of the stationary mold portion prior to closure of the mold by the approach of another mold portion on the movable platen. With the mold closed, and upon an elastic stretching of the tie bars by the exerted mold-clamping force, the plunger head is repressed by slightly less than 1 mm to unblock the nozzle orifice and let the precompressed mass in the injection unit enter the cavity or cavities thereof.

5 Claims, 4 Drawing Figures

INJECTION-MOLDING MACHINE WITH HYDRAULIC MOLD CLAMPING

FIELD OF THE INVENTION

My present invention relates to an injection-molding machine of the type wherein two (or possibly more) relatively movable mold portions are hydraulically operated with application of an intensified clamping pressure in a final stage of a mold-closing stroke.

BACKGROUND OF THE INVENTION

In commonly owned U.S. Pat. No. 3,117,348 to Herbert Rees there has been disclosed an injection-molding machine with a first mold portion on a movable platen and a second mold portion on a quasi-stationary platen which is supported by a spring mounting on a fixed backing plate, the latter forming one anchor for a set of tie bars whose other anchor is a superstructure on the machine bed containing a mechanical clamping unit. An injection unit rigid with the fixed backing plate has an orifice leading to a sprue in the substantially stationary mold portion, this orifice being blocked in the open-mold position by a valve which is repressed by that mold portion upon displacement thereof by the movable portion so that molten plastic material may pass from a precompression chamber (also known as a shooting pot) through that orifice and the sprue into a cavity. This occurs in the terminal phase of the mold-closing stroke in which the cavity-forming mold portion moves together with its supporting platen against the countervailing spring pressure toward the backing plate, the platen then coming to rest against that plate.

With a hydraulic mold drive operating in two stages, i.e. under relatively low pressure during the major part of a mold-closing stroke to establish contact between the mold portions and with an increased clamping pressure exerted in the final phase of that stroke, a floating platen limitedly movable on a fixed backing plate (as disclosed in the above-identified Rees patent) would not be useful. In such a machine the terminal clamping pressure is absorbed by an elastic stretch of the tie bars to which the quasi-stationary platen is attached; this platen, therefore, should have limited mobility on the machine bed to allow a certain extension of the tie bars, generally on the order of one millimeter. The displacement of this platen is consequently substantially shorter than in the conventional case, owing to the higher modulus of elasticity of the tie bars compared with the countervailing springs of the Rees patent. Because, moreover, the clamping pressure is relatively low at the beginning of the tie-bar stretch, it is no longer possible to open the injection valve upon initial contact between the mold portions since this would allow the precompressed plastic mass to leak out at their junction and to cause flashing so as to spoil the product.

A possible solution to this problem resides in keeping the injection unit retracted from the quasi-stationary platen and advancing it into a valve-opening position only in response to a signal showing that the mold has been fully closed. This, however, would cause a significant delay in the start of the molding operation with objectionable lengthening of the work cycle.

Conceivably, the advance of the injection unit could be timed to occur slightly earlier so that the valve member meets the quasi-stationary mold portion just at the end of the closing stroke. Such a solution is also not very practical because of the short time involved whereby variations in oil viscosity and other operating parameters may again cause a premature opening of the injection orifice.

OBJECT OF THE INVENTION

The object of my present invention, therefore, is to provide improved means in such a molding machine for insuring the unblocking of an injection orifice at exactly the right moment.

SUMMARY OF THE INVENTION

In accordance with my present improvement, the quasi-stationary platen is mounted on the machine body with freedom of limited movement to follow the stretching and subsequent contraction of the metallic tie bars by which that platen is secured to a structure rigid with the bed, namely a housing for a two-stage hydraulic mold drive of the type discussed above. An injection unit mounted on the machine bed, on the side of the quasi-stationary platen remote from the movable platen, includes a precompression chamber whose outlet terminates at an orifice of a nozzle provided with gating means for preventing the flow of precompressed plastic material from that chamber through the orifice to the sprue of the cavity-forming mold plate, the gating means comprising a movable member which blocks the outlet in a forward position and unblocks it in a rearward position. The gating member, advantageously designed as a hollow plunger disposed in the nozzle orifice, has a front end which is closely juxtaposed with the sprue with a predetermined clearance and is displaceable thereby from its forward position into its rearward position against a biasing force, constituted entirely or in part by the pressure of the molten plastic material in the precompression chamber, for unblocking the outlet upon closure of the mold by the drive means with exertion of a clamping force which displaces the cavity plate and its platen within the limits of elastic stretchability of the tie bars.

Pursuant to a more particular feature of my invention, the injection unit is provided with an adjustable support such as a slidable carriage facilitating the selection of an optimum position for the gating member relative to the associated mold plate. Such a carriage may be anchored to the quasi-stationary platen by a hydraulic linkage acting against manually settable stop means on the bed.

BRIEF DESCRIPTION OF THE DRAWING

The above and other features of my present invention will now be described in detail with reference to the accompanying drawing in which.

SPECIFIC DESCRIPTION

Figure 1:
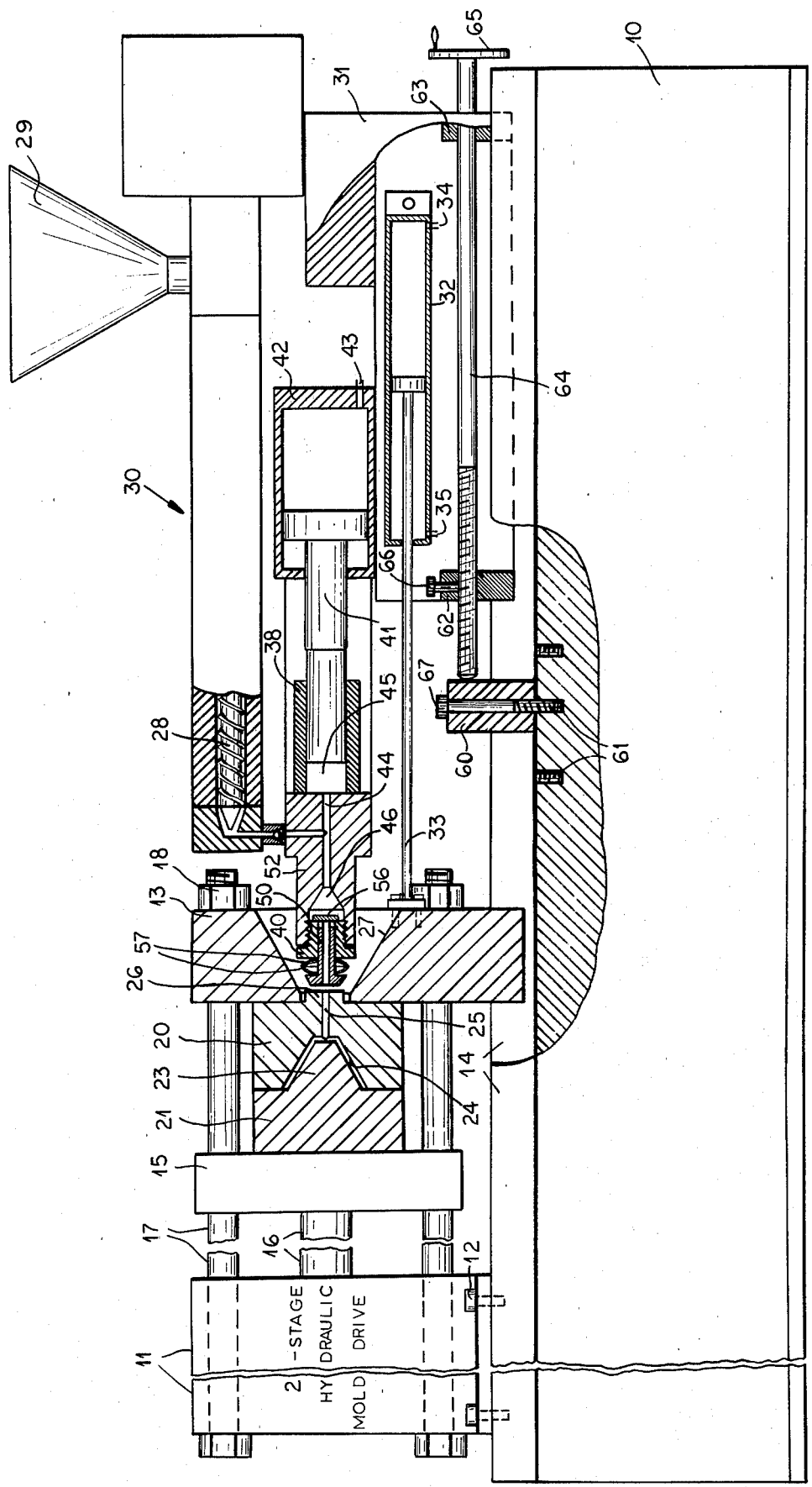
FIG. 1 is a side-elevational view, partly in section, of an injection-molding machine embodying the present improvement.
Figure 2:
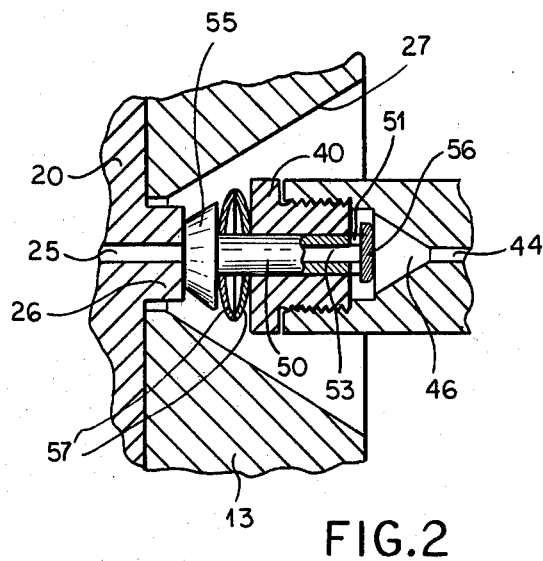
FIG. 2 is an enlarged sectional detail view of an injection nozzle forming part of the machine of FIG. 1.

In FIG. 1 I have shown a partly conventional injection-molding machine with an injection unit 30, generally similar to that of the aforementioned prior U.S. Pat. No. 3,117,348, adjustably supported by a carriage 31 on a machine bed or base 10. A two-stage hydraulic mold drive and clamping mechanism 11 is fixedly mounted, with the aid of screws 12, on the left-hand end of the bed remote from injection unit 30. Such a drive has been disclosed in commonly owned U.S. Pat. Nos. 4,017,236 and 4,230,442. A column or ram 16 of drive unit 11 is secured to a movable platen 15 which slides on a set of tie bars 17 and carries a mold half 21 with a core 23 fitting into a cavity 24 of a complementary mold half 20. The latter is a plate carried on a quasi-stationary platen 13 which is anchored by nuts 18 to the tie bars 17 and, like carriage 31, is slidable on a pair of rails 14 rising from the upper surface of machine bed 10. Cavity 24, which of course may be one of several such cavities formed in mold plate 20, opens onto a sprue 25 terminating at a rear face of a boss 26 integral with plate 20 which projects into a cutout 27 of platen 13 (see also FIG. 2).

Injection unit 30 comprises a feed screw 28 delivering liquefiable plastic material, introduced through a hopper 29, via a check valve to a channel 44 within a mouthpiece 52 of a shooting pot 38 which forms a precompression chamber 45 communicating via channel 44 with an outlet 46. This outlet is closed by a nozzle 40, shown more clearly in FIG. 2, which has an axial bore traversed by a hollow plunger 50 with an enlarged head 55 and a tail end formed by a disk 56. In the position of FIG. 1 disk 56 lies flush against the nozzle 40 under the pressure of liquefied plastic material in chamber 45 and of a pair of Belleville springs 57 inserted between nozzle 40 and head 55. Plunger 50 has a central passage 53 which, upon repression of the plunger against its biasing force into the position of FIG. 2, communicates with outlet 46 by way of lateral apertures 51.

Injection unit 30 further comprises a piston 41 whose head slides in a hydraulic cylinder 42 to which oil under pressure is admitted via a port 43, in timed relationship with the operation of feed screw 28 and with the reciprocation of movable platen 15, in the manner described in prior U.S. Pat. No. 3,117,348. A leftward advance of piston 41 prior to full closure of mold 20, 21, i.e. with plunger 50 in the position of FIG. 1, compresses the plastic material within chamber 45 (melted with the aid of nonillustrated heating means) while feed screw 28 is being withdrawn preparatorily to a new injection cycle. When the increased hydraulic pressure in the final clamping phase of a mold-closing stroke displaces the platen 13 with mold plate 20 to the right, against the elastic force of the tie bars 17, boss 26 contacts the plunger head 55 previously separated therefrom by a small clearance (e.g. of 0.2 to 0.3 mm); with further stretching of these tie bars, plunger 50 is repressed to the right whereby disk 56 is lifted off the rear face of nozzle 40 and establishes communication between outlet 46 and passage 53. The precompressed plastic material can now flow through this passage into the sprue 25 aligned therewith and thence into cavity 24.

When the mold is subsequently opened, plunger 50 immediately recloses the passage 53 and allows a fresh charge of molding material to be compressed in chamber 45.

As further shown in FIG. 1, carriage 31 is linked with platen 13 by a piston 33 whose head slides in a double-acting hydraulic cylinder 32 with ports 34 and 35 which can alternately be connected to a nonillustrated source of oil under pressure. When oil is admitted into the right-hand cylinder section via port 34, carriage 31 with injection unit 30 slides away from platen 13 so as to give access to the nozzle 40, e.g. for the purpose of inspection or replacement thereof. In normal operation, however, the left-hand section of cylinder 32 is pressurized via port 35 to immobilize the carriage 31 on bed 10 with the aid of a threaded rod 64 supported by a complementarily threaded block 62 and a bearing block 63 rigid with carriage 31. The left-hand end of rod 64 contacts a stop in the form of a transverse block 60 which lies between the rails 14 and can be fastened to the bed 10 by bolts 67 (only one shown) adapted to be screwed into any of several sets of threaded holes 61 in the surface of that bed. This enables a coarse adjustment of the position of carriage 31; for a fine adjustment, rod 64 carries a handwheel 65 allowing its longitudinal displacement relative to carriage 31. A setscrew 66 enables the rod to be immobilized in its nut 62 upon selection of the proper position and thus of the requisite clearance between plunger head 55 and boss 26.

Figure 3:
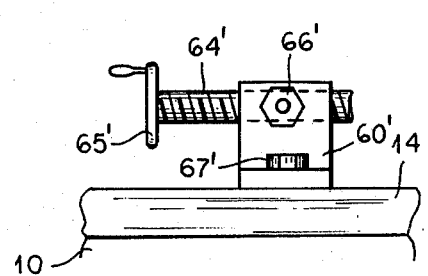

In FIG. 3 I have shown an alternate carriage-arresting device in which a block 60', fastenable to machine bed 10 at selected locations in the aforedescribed manner with the aid of bolts 67', has a threaded bore traversed by a complementarily threaded rod 64' provided with a handwheel 65', this rod being disposed to the left of carriage 31 (FIG. 1) to act as a stop therefor. Rod 64' can be immobilized in block 60' with the aid of a setscrew 66'.

Figure 4:
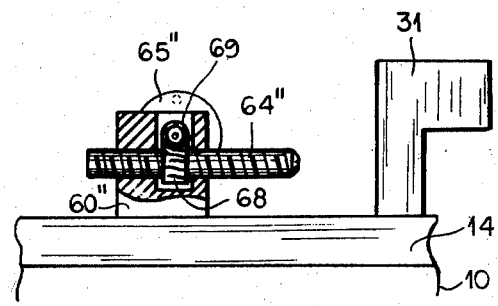
FIGS. 3 and 4 are fragmentary elevational views of various stop means for the positioning of an injection unit carrying the nozzle of FIG. 2.

Still another positioning device has been illustrated in FIG. 4 where an internally threaded block 60", generally similar to block 60' of FIG. 3, mates with a screw-threaded rod 64" and has an internal clearance accommodating a worm wheel 68 coupled with that rod, wheel 68 meshing with a worm 69 on a shaft of a handwheel 65" whose rotation thus causes a longitudinal displacement of the rod along bed 10. The latter, again, forms a stop for the left-hand end of carriage 31. Because of the self-locking nature of the worm drive 68, 69, no special means for immobilizing the rod after its adjustment may be required in this instance.

Belleville springs 57 may be omitted if the biasing force of the compressed plastic material, acting upon disk 56, is sufficient to hold the plunger 50 in its flow-blocking position as long as the mold is open or only partly closed. This biasing force, of course, tends to shift the entire injection unit 30 to the right during the clamping phase in which boss 26 bears upon plunger head 55; to prevent such shifting, the hydraulic pressure in cylinder 32 has to be greater than the biasing force exerted upon the plunger.

The maintenance of an initial clearance between the plunger head 55 and the cavity plate 20, equal to a fraction of the plunger stroke (e.g. of one millimeter) limited by that head and by the rear disk 56, avoids the risk of a premature injection since the pressure of the plastic material upon disk 56 is maintained until the mold-clamping force has been sufficiently developed.

It will be apparent that my invention is also applicable to injection units in which the function of piston 41 is taken over by a feed screw (28) reciprocable in line with channel 44. The improved gating means disclosed hereinabove can also be used with mold drives operating mechanically instead of fluidically.

I claim:

1. In an injection-molding machine having a bed, a first platen secured by a set of metallic tie bars to a structure rigid with said bed, a second platen movable along said tie bars toward and away from said first platen, drive means included in said structure for reciprocating said second platen along said tie bars to open and close a mold having portions respectively carried on said platens, said first platen having an aperture giving access to a sprue on the mold portion carried thereby, an injection unit on the side of said first platen opposite said second platen provided with a precompression chamber having an outlet terminating at an orifice of a nozzle which confronts said sprue by way of said aperture, and gating means on said nozzle for preventing the flow of precompressed plastic material from said chamber through said orifice into said sprue prior to closure of the mold;

the improvement wherein said gating means comprises a movable member blocking said outlet in a forward position and unblocking same in a rearward position, said member having a front end closely juxtaposed with said sprue in a mold-open position with a predetermined clearance and displaceable thereby from said forward position into said rearward position against a biasing force, constituted at least in part by the pressure of said plastic material, for unblocking said outlet upon closure of said mold by said drive means with exertion of a mold-clamping force causing elastic stretching of said tie bars, said first platen being mounted on said bed with freedom of limited movement to follow the stretching and subsequent contraction of said tie bars, said injection unit being supported on said bed by a slidable carriage anchored to said first platen by a hydraulic linkage provided with manually settable stop means for arresting said carriage in a selected relative position on said bed in which said clearance amounts to a fraction of the maximum stretch of said tie bars in said mold-open position.

2. A machine as defined in claim 1 wherein said clearance measures a fraction of a millimeter in said mold-open position.

3. A machine as defined in claim 1 or 2 wherein said drive means comprises a two-stage hydraulic drive.

4. A machine as defined in claim 1 or 2 wherein said member is a hollow plunger disposed in said orifice and provided with an enlarged head at said front end.

5. A machine as defined in claim 4 wherein said plunger is provided with an enlarged tail end coming to rest against a rear face of said nozzle and obstructing said orifice in said forward position.

* * * * *